(12) United States Patent
Baglin et al.

(10) Patent No.: US 10,691,403 B2
(45) Date of Patent: Jun. 23, 2020

(54) COMMUNICATION DEVICE AND METHOD FOR AUDIO ENCODED DATA RADIO TRANSMISSION

(71) Applicant: Intel Corporation, Santa Clara, CA (US)

(72) Inventors: Matthieu Baglin, Toulouse (FR); Sebastien Guiriec, Toulouse (FR)

(73) Assignee: Intel Corporation, Santa Clara, CA (US)

( * ) Notice: Subject to any disclaimer, the term of this patent is extended or adjusted under 35 U.S.C. 154(b) by 72 days.

(21) Appl. No.: 15/846,266

(22) Filed: Dec. 19, 2017

(65) Prior Publication Data

US 2018/0189022 A1    Jul. 5, 2018

(30) Foreign Application Priority Data

Dec. 29, 2016  (EP) ..................... 16207247

(51) Int. Cl.
| | |
|---|---|
| *G06F 3/16* | (2006.01) |
| *H04W 88/02* | (2009.01) |
| *H04L 29/08* | (2006.01) |
| *H04W 4/90* | (2018.01) |

(52) U.S. Cl.
CPC ............ *G06F 3/165* (2013.01); *H04L 69/323* (2013.01); *H04W 88/02* (2013.01); *H04W 4/90* (2018.02)

(58) Field of Classification Search
None
See application file for complete search history.

(56) References Cited

U.S. PATENT DOCUMENTS

| | | | | |
|---|---|---|---|---|
| 2005/0163263 | A1* | 7/2005 | Gupta | H04L 27/2656 375/343 |
| 2012/0135787 | A1* | 5/2012 | Kusunoki | H04M 1/0214 455/575.8 |
| 2015/0334668 | A1* | 11/2015 | Weber | H04W 56/001 455/404.1 |
| 2015/0358767 | A1* | 12/2015 | Luna | G01S 5/0263 455/456.1 |
| 2016/0033619 | A1* | 2/2016 | Calvarese | G01S 5/26 367/125 |

(Continued)

FOREIGN PATENT DOCUMENTS

| | | |
|---|---|---|
| EP | 2899993 A1 | 7/2015 |
| WO | 2015175798 A1 | 11/2015 |

OTHER PUBLICATIONS

European Search Report based on application No. 16207247.4 (9 pages) dated Jun. 26, 2017.

(Continued)

*Primary Examiner* — Noel R Beharry
*Assistant Examiner* — Sharmin Chowdhury
(74) *Attorney, Agent, or Firm* — Viering, Jentschura & Partner MBB

(57) ABSTRACT

A communication device is provided that includes a receiver configured to receive a signal. The communication device further includes a determination circuit configured to determine an energy level of the signal and to decode the signal as voice or encoded data. The communication device further includes at least one processor configured to generate an instruction to mute or unmute an audio output based on the energy level of the signal in a predefined audio frequency range.

22 Claims, 8 Drawing Sheets

(56) References Cited

U.S. PATENT DOCUMENTS

2016/0087706 A1* 3/2016 Guey .................. H04L 27/2607
375/267

OTHER PUBLICATIONS

"Digital cellular telecommunications system (Phase 2+); Universal Mobile Telecommunications System (UMTS); eCall data transfer; In-band modem solution; ANSI-C reference code", Oct. 2014, version 12.0.0, release 12, 3GPP.

"Digital cellular telecommunications system (Phase 2+); Universal Mobile Telecommunications System (UMTS); eCall data transfer; In-band modem solution; General description", Oct. 2014, version 12.0.0, release 12, 3GPP.

"Technical Specification Group Services and System Aspects; eCall Data Transfer; In-band modem solution; General Description", Dec. 12, version 12.0.0, release 12, 3rd Generation Partnership Project.

* cited by examiner

COMMUNICATION DEVICE AND METHOD FOR AUDIO ENCODED DATA RADIO TRANSMISSION

CROSS-REFERENCE TO RELATED APPLICATION

This application claims priority to European Patent Application Serial No. 16 207 247.4, which was filed Dec. 29, 2016, and is incorporated herein by reference in its entirety.

TECHNICAL FIELD

The present disclosure relates to communication devices and methods for radio communication.

BACKGROUND

In a scenario, a communication device transmits and receives voice signals via a radio frequency connection. Further, the communication device receives a request to transmit a set of data. It may be desirable to provide a communication device and a method that may mute an audio output of voice signals in a fast and reliable manner during the transmission and reception of data packets that do not include speech transmissions.

SUMMARY

A communication device is provided that includes a receiver configured to receive a signal. The communication device further includes a determination circuit configured to determine an energy level of the signal. The communication device further includes at least one processor configured to generate a mute instruction to mute an audio output, if the energy level of the signal in a predefined audio frequency range is equal to or exceeds a first threshold in a first time period, and if an energy level sequence of a plurality of determined energy levels in the predefined audio frequency range in a second time period following the first time period is determined, in which each determined energy level of the signal of the energy level sequence is equal to or exceeds a second threshold.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
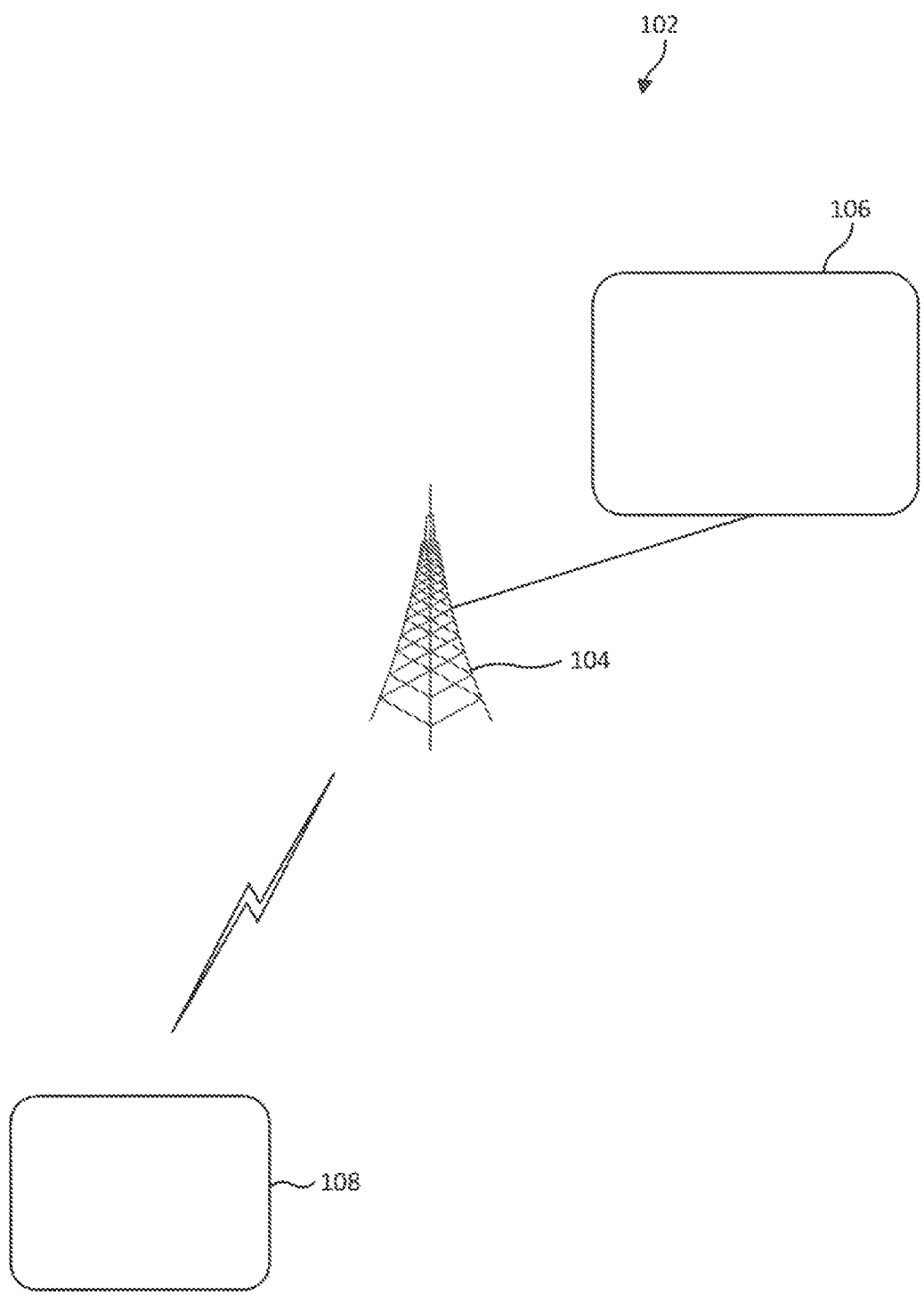
FIG. 1 shows a schematic drawing of an emergency call system that includes a communication device.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various aspects of this disclosure provide a communication device that may include a receiver configured to receive a signal. Further, the communication device may include a determination circuit configured to determine an energy level of the signal and at least one processor configured to generate a mute instruction to mute an audio output if the energy level of the signal in a predefined audio frequency range is equal to or exceeds a first threshold in a first time period and if an energy level sequence of a plurality of determined energy levels of the signal in the predefined audio frequency range in a second time period following the first time period is determined, in which each determined energy level of the signal of the energy level sequence is equal to or exceeds a second threshold.

Thus, a simple communication device may be provided that effectively prevents an audio output based on encoded data packets that do not include voice output data. Further, the communication device may be applicable to emergency call systems that have been deployed based on cellular communication standards. The communication device may be configured to play voice prompt signals that are output via a loudspeaker to fill the gap during which the audio is muted when encoded data packets are transmitted or received. The audio output may be muted by dampening the output, reducing the gain of an audio output signal or by preventing a transmission of the audio output signals to the audio output device.

In an example, the predefined audio frequency range may include at least one of a group of frequencies consisting of about 500 Hz and about 800 Hz. Further, the energy level of the signal in the first time period may be equal to or exceeds the first threshold in at least one of the group of frequencies. Thus, the communication device may be compatible to emergency call systems for vehicles.

In an example, the first time period may be equal or less than about 64 milliseconds and the second time period may be equal or less than about 260 milliseconds.

In an example, the communication device may further include a demodulation circuit configured to demodulate the signal in the second time period and to generate data packets. The at least one processor may be configured to generate the mute instruction to mute the audio output, if the energy level of the signal in the predefined audio frequency range is equal to or exceeds the first threshold in the first time period, if the energy level sequence of the plurality of determined energy levels in the predefined audio frequency range in the second time period following the first time period is determined, in which each determined energy level of the signal of the energy level sequence is equal to or exceeds the second threshold, and if a data packet of the generated data packets includes a predefined bit sequence that is decoded by the receiver. Thus, the communication device may reliably determine the condition to mute the audio output.

In an example, the second threshold exceeds the first threshold.

In an example, the signal may be a radio frequency signal.

In an example, the determination circuit may be configured to determine the energy level of the signal in the at least one frequency by a Discrete Fourier Transform algorithm.

In an example, the Discrete Fourier Transform algorithm may be one of a group of algorithms consisting of Goertzel algorithm and Fast Fourier Transform. Thus, the amplitude of the predefined frequency may be determined in an efficient manner.

In an example, the mute instruction may be generated in a third time period of about 20 milliseconds following the second time period. Thus, the communication device may effectively prevent the audio output based on data packets that do not include audio output data.

In an example, the at least one processor may be configured to generate an activation instruction to activate the audio output if the energy level of the signal in the predefined audio frequency range is below the first threshold in a fourth time period following the second time period. Thus, the communication device may reliably activate the audio output if the signal to mute the audio output is not confirmed. In an example, the fourth time period may be twice as long as first time period.

In an example, the at least one processor may be configured to generate an activation instruction to activate the audio output, if the energy level of the signal in the predefined audio frequency range is equal to or exceeds the first threshold in a fifth time period following the second time period, if a second energy level sequence of a second plurality of determined energy levels in the predefined audio frequency range in a sixth time period following the fifth time period is determined, in which each determined energy level of the signal of the second energy level sequence is equal to or exceeds the second threshold, and if the energy level of the signal in the predefined audio frequency range is below the first threshold in a seventh time period following the sixth time period. Thus, the communication device may reliably prevent an audio output based on data packets that do not include audio output data.

In an example, the duration of the seventh time period may be in a range from about 400 milliseconds to about 500 milliseconds.

In an example, the audio output may be coupled to the processor to receive the mute instruction.

Various aspects of this disclosure provide a communication device that may include a circuit configured to determine an energy level of a received signal and at least one processor configured to generate a mute signal to mute an audio output device, if the energy level of the received signal in an audio frequency range is equal to or exceeds a first threshold during a first time period and if an energy level sequence of a plurality of determined energy levels of the signal in the audio frequency range during a second time period following the first time period is determined, in which each determined energy level of the signal of the energy level sequence is equal to or exceeds a second threshold.

Thus, a simple communication device may be provided that effectively prevents an audio output based on encoded data packets that do not include voice output data. The communication device may be configured to play voice prompt signals that are output via a loudspeaker to fill the gap during which the audio is muted when encoded data packets are transmitted or received. The audio output may be muted by dampening the output, reducing the gain of an audio output signal or by preventing a transmission of the audio output signals to the audio output device.

In an example, the communication device may further include a demodulation circuit configured to demodulate the received signal during the second time period and to generate data packets. The at least one processor may be configured to generate the mute signal to mute the audio output device, if the energy level of the signal in the audio frequency range is equal to or exceeds the first threshold during the first time period, if the energy level sequence of the plurality of determined energy levels of the signal in the audio frequency range during the second time period following the first time period is determined, in which each determined energy level of the signal of the energy level sequence is equal to or exceeds the second threshold and if a data packet of the generated data packets includes a predefined bit sequence.

Various aspects of this disclosure provide a communication system that may include a communication device. The communication device may include a receiver configured to receive a signal from a base station. Further, the communication device may include a demodulation circuit configured to demodulate the received signal and to generate data packets. Moreover, the communication device may include a determination circuit configured to determine an energy level of the received signal and at least one processor configured to generate a mute instruction to mute an audio output, if the energy level of the signal in a predefined audio frequency range is equal to or exceeds a first threshold in a first time period, and if an energy level sequence of a plurality of determined energy levels in the predefined audio frequency range in a second time period following the first time period is determined, in which each determined energy level of the signal of the energy level sequence is equal to or exceeds a second threshold. The at least one processor may be configured to generate an activation instruction to activate the audio output if the signal includes the activation data packet. Thus, the communication system may reliably and effectively prevent an audio output of data packets that do not include audio output data.

In an example, the communication system may include an audio modulation device configured to modulate voice signals to generate radio frequency signals. The audio modulation device may be configured to generate an activation data packet that includes an information to activate the audio output. The receiver may be configured to receive the activation data packet. Thus, the communication system may be designed in a simple and cost effective manner to mute an audio output of a receiving communication device.

In an example, the base station may be configured to receive the activation data packet from a Public Safety Answering Point.

In an example, the plurality of determined energy levels includes at least five determined energy levels.

Furthermore, a method for radio communication may be provided that may include receiving a signal, determining an energy level of the signal and generating a mute instruction to mute an audio output, if the energy level of the signal in a predefined audio frequency range is equal to or exceeds a first threshold in a first time period and if an energy level sequence of a plurality of determined energy levels in the predefined audio frequency range in a second time period following the first time period is determined, in which each determined energy level of the signal of the energy level sequence is equal to or exceeds a second threshold. Thus, a simple method may be provided that effectively prevents an audio output based on data packets that do not include audio output data.

Furthermore, a second method for radio communication may be provided that may include a determining an energy level of a received signal and generating a mute signal to mute an audio output device, if the energy level of the received signal in an audio frequency range is equal to or exceeds a first threshold during a first time period, and if an energy level sequence of a plurality of determined energy levels of the signal in the audio frequency range during a second time period following the first time period is determined, in which each determined energy level of the signal of the energy level sequence is equal to or exceeds a second threshold. Thus, a simple method may be provided that effectively prevents an audio output based on data packets that do not include audio output data.

Furthermore, a second method for radio communication may be provided that may include transmitting an activation data packet, receiving a signal, demodulating the signal, generating data packets, determining an energy level of the signal and generating a mute instruction to mute an audio output, if the energy level of the signal in a predefined audio frequency range is equal to or exceeds a first threshold in a first time period, and if an energy level sequence of a plurality of determined energy levels in the predefined audio frequency range in a second time period following the first time period is determined, in which each determined energy level of the signal of the energy level sequence is equal to or exceeds a second threshold. Further, the second method may include generating an activation instruction to activate the audio output if the signal includes the activation data packet. Thus, the method may reliably and effectively prevent an audio output of data packets that do not include audio output data.

It should be noted that aspects described in the context of the previous examples may be analogously valid for the above provided methods.

FIG. 1 shows a schematic drawing of an emergency call system 102 that may include a base station 104, a Public Safety Answering Point 106 (PSAP) and a communication device 108. The communication device 108 may be connected with the base station 104 via a radio frequency connection. The radio frequency connection may be a connection in accordance with the Global System for Communications (GSM) standard, the Universal Mobile Telecommunications System (UMTS) standard or any other radio communication standards. Further, the communication device 100 may be configured to transmit voice data and a Minimum Set of Data (MSD) via the radio frequency connection to the base station 104. The base station 104 may be configured to transmit the received voice data and the MSD to the PSAP 106. The PSAP 106 may be configured to transmit request data packets to request a transmission of the MSD to the base station 104 and to transmit acknowledgement data packets to acknowledge a reception of the MSD to the base station 104. The base station 104 may be configured to transmit the request data packets and the acknowledgement data packets via the radio frequency connection to the communication device 108.

Figure 2:
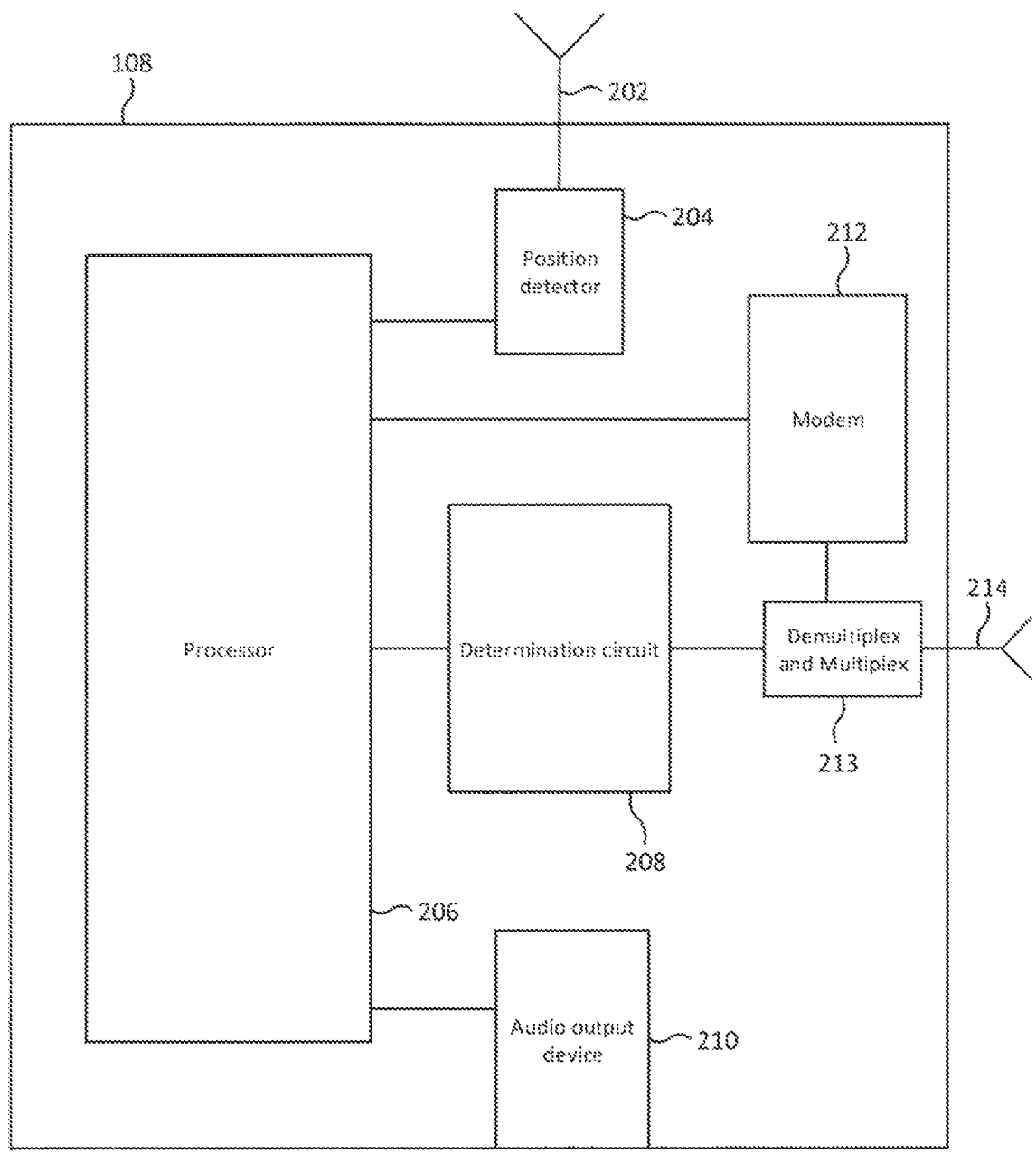
FIG. 2 shows a schematic drawing of the communication device.

FIG. 2 shows a schematic drawing of the communication device 108. The communication device 108 may include a first antenna 202, a position detection circuit 204, a processor 206, a determination circuit 208, an audio output device 210, a modulation and demodulation circuit 212, a multiplexing and demultiplexing circuit 213 and a second antenna 214. The first antenna 202 may be connected with the position detection circuit 204. The position detection circuit 204 may be configured to determine the position based on signals received by the first antenna 202. In an example, the position detection circuit 204 may be configured to detect the position based on the Global Positioning System. Further, the position detection circuit 204 may be connected with the processor 206. The processor 206 may be connected with the determination circuit 208, the modulation and demodulation circuit 212 and the audio output device 210. The audio output device may include a loudspeaker to output an audio output. The determination circuit 208 may be connected with the multiplexing and demultiplexing circuit 213. The multiplexing and demultiplexing circuit 213 may be connected with the modulation and demodulation circuit 212 and the second antenna 214. A third back-up antenna may be included in case the second antenna is damaged during the emergency situation.

The second antenna 214 may be configured to receive a radio frequency signal and to transmit the received signal to the multiplexing and demultiplexing circuit 213. The multiplexing and demultiplexing circuit 213 may be configured to transmit the received signal to the determination circuit 208 and the modulation and demodulation circuit 212. The modulation and demodulation circuit 212 may be configured to demodulate and decode the received signal based on a speech codec and to transmit the decoded signal to the processor 206. The processor 206 may be configured to transmit audio output signals to the audio output device 210. The audio output signals may be based on the received signal.

The determination circuit 208 may be configured to determine an energy level of the received signal and to transmit an energy level information to the processor 206. The processor 206 may be configured to determine the energy level in a predefined audio frequency range based on the energy level information. Further, the processor 206 may be configured to determine if the energy level in the predefined audio frequency range is equal to or exceeds a first threshold in a first time period. In an example, the first time period may be about 64 milliseconds. Further, the processor 206 may be configured to determine an energy level sequence of the signal in the predefined audio frequency range in a second time period following the first time period based on the energy level information. Moreover, the processor 206 may be configured to determine if each determined energy level of the signal of the energy level sequence is equal to or exceeds a second threshold. Further, the processor 206 may be configured to mute an audio output of the audio output device 210 if the energy level in the predefined audio frequency range is equal to or exceeds a first threshold in a first time period and if each determined energy level of the signal of the energy level sequence is equal to or exceeds the second threshold. In an example, the processor 206 may be configured to mute the audio output based on the received signal and to transmit a predefined voice message to the audio output device 210.

The processor 206 may be configured to transmit a synchronization data packet that may include a tone information associated with one of the synchronization tones of about 500 Hz and about 800 Hz and a synchronization preamble to the modulation and demodulation circuit 212. The modulation and demodulation circuit 212 may be configured to encode the received data packets based on a speech codec and to transmit the encoded data packets to the second antenna 214. Further, the processor 206 may be configured to append an MSD data packet with a Cyclic Redundancy Check (CRC) information, to encode the appended MSD data packet with a forward error correction coding and to transmit the MSD data packet to the modulation and demodulation circuit 212. The modulation and demodulation circuit 212 may be configured to modulate the encoded data packet into waveform symbols and to transmit the modulated data packet to the multiplexing and demultiplexing circuit 213.

Figure 3:
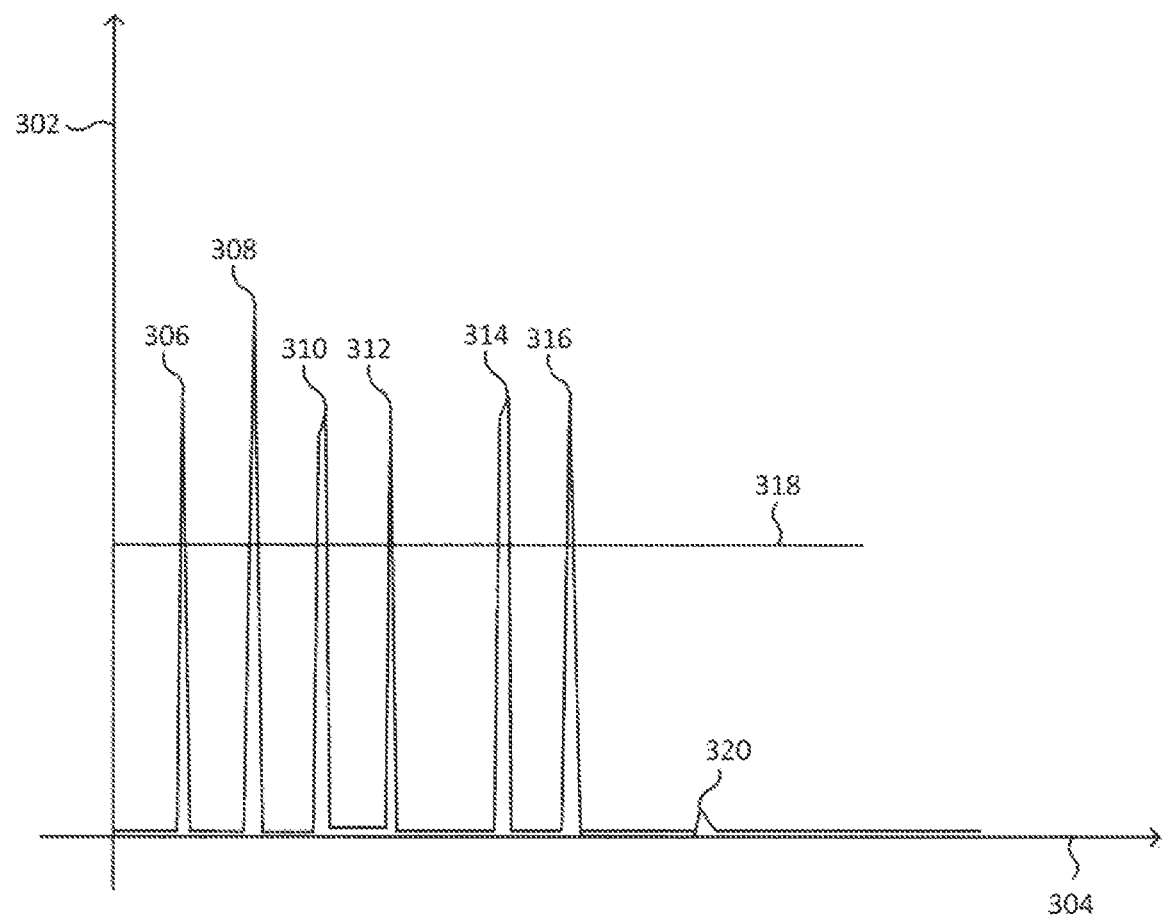
FIG. 3 shows a diagram of energy levels of a signal in the predefined audio frequency range in a time period.

FIG. 3 shows a diagram of energy levels of a signal in the predefined audio frequency range in a time period. The diagram has a first axis 302 that may indicate the value of the amplitudes of the first frequency and a second axis 304 that may indicate a reception time of the signal. The energy levels may correspond to amplitudes of the signal, respectively. In an example, the amplitudes may correspond to a frequency of about 500 Hz. Further, the diagram shows energy levels 306, 308, 310, 312, 314 and 316 of the signal in the predefined audio frequency range. The energy levels 306, 308, 310, 312, 314 and 316 may exceed a threshold 318. A portion of the signal that includes voice data may correspond to an amplitude 320 of the first frequency that is smaller than the threshold 318.

The processor 206 may be configured to determine the energy level of the signal in the predefined audio frequency range by a Goertzel algorithm or a Fast Fourier Transform algorithm based on the energy level information. Further, the processor 206 may be configured to compare the energy level with the threshold 318.

Figure 4:
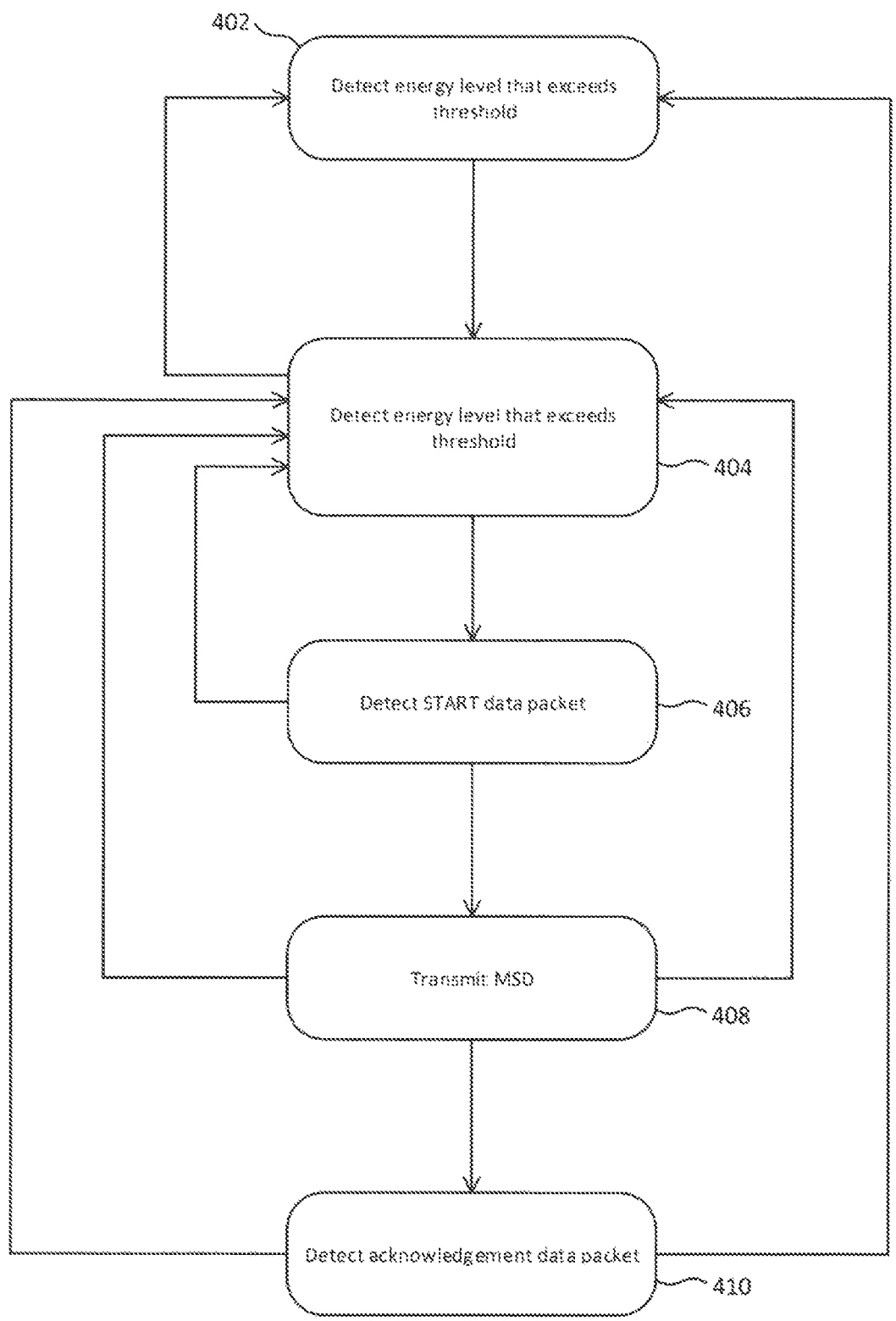
FIG. 4 shows a flow diagram that a communication device may be configured to execute.

FIG. 4 shows a flow diagram that a communication device may be configured to execute.

In 402, the determination circuit may be configured to determine an energy level of the signal and to transmit an energy level information to the processor. Further, the processor may be configured to determine the energy level in the first time period in the predefined audio frequency range based on the energy level information. The processor may determine an energy level sequence of a plurality of determined energy levels in the predefined audio frequency range in the second time period following the first time period. If the energy level in the first time period exceeds the first threshold and if each determined energy level of the sequence exceeds the second threshold the processor may be configured to mute the audio output.

In an example, if the energy level in the first time period exceeds the first threshold the processor may be configured to mute the audio output.

Further, the processor may be configured to detect a first synchronization data packet of the signal. Moreover, in the positive case, the communication device may be configured to execute 404. If at least one of the determined energy levels is smaller than the respective threshold the processor may be configured to continue to determine the energy level in the predefined audio frequency range.

In 404, the determination circuit may be configured to determine an energy level of the signal. Further, the processor may be configured to determine the energy level in a third time period in the predefined audio frequency range. The processor may determine an energy level sequence of the plurality of determined energy levels in the predefined audio frequency range in a fourth time period following the third time period. If the energy level in the third time period exceeds the first threshold and if each determined energy level of the sequence exceeds the second threshold the processor may be configured to determine a second synchronization data packet of the signal and a third synchronization data packet of the signal. If three correct synchronization data packets are detected, the communication device may be configured to execute 406. If at least one of the determined energy levels is smaller than the respective threshold the processor may be configured to activate the audio output of the audio output device. Moreover, the communication device may be configured to execute 402.

In 406, the processor may be configured to detect a start data packet of the signal in a fifth time period. The start data packet may include an information to start the transmission of the MSD. If the start data packet is detected the communication device may be configured to execute 408. If the start data packet is not detected in the fifth time period the communication device may be configured to execute 404.

In 408, the processor may be configured to transmit a MSD to the modulation and demodulation circuit. If the MSD is transmitted the processor may be configured to execute 410. If a synchronization check failure that may indicate an unsuccessful transmission of the MSD is detected the communication device may be configured to execute 404.

In 410, the processor may be configured to detect an acknowledgment data packet of the received signal that may indicate a successful transmission of the MSD. If the acknowledgment data packet is detected the communication device may be configured to activate the audio output. Further, the communication device may be configured to execute 402. If the acknowledgement data packet is not detected, the communication device may be configured to execute 404.

It may be noted that all other aspects of the communication device may correspond to aspects of the communication device 108 of FIG. 1, FIG. 2 and FIG. 3.

In an example, instead of 410, a communication device of a communication system may receive an activation data packet that may be transmitted from a base station of the communication system. Further, the communication device may be configured to activate the audio output if the activation data packet is detected. All other aspects of the communication device may correspond to aspects of the communication device of FIG. 4.

Figure 5:
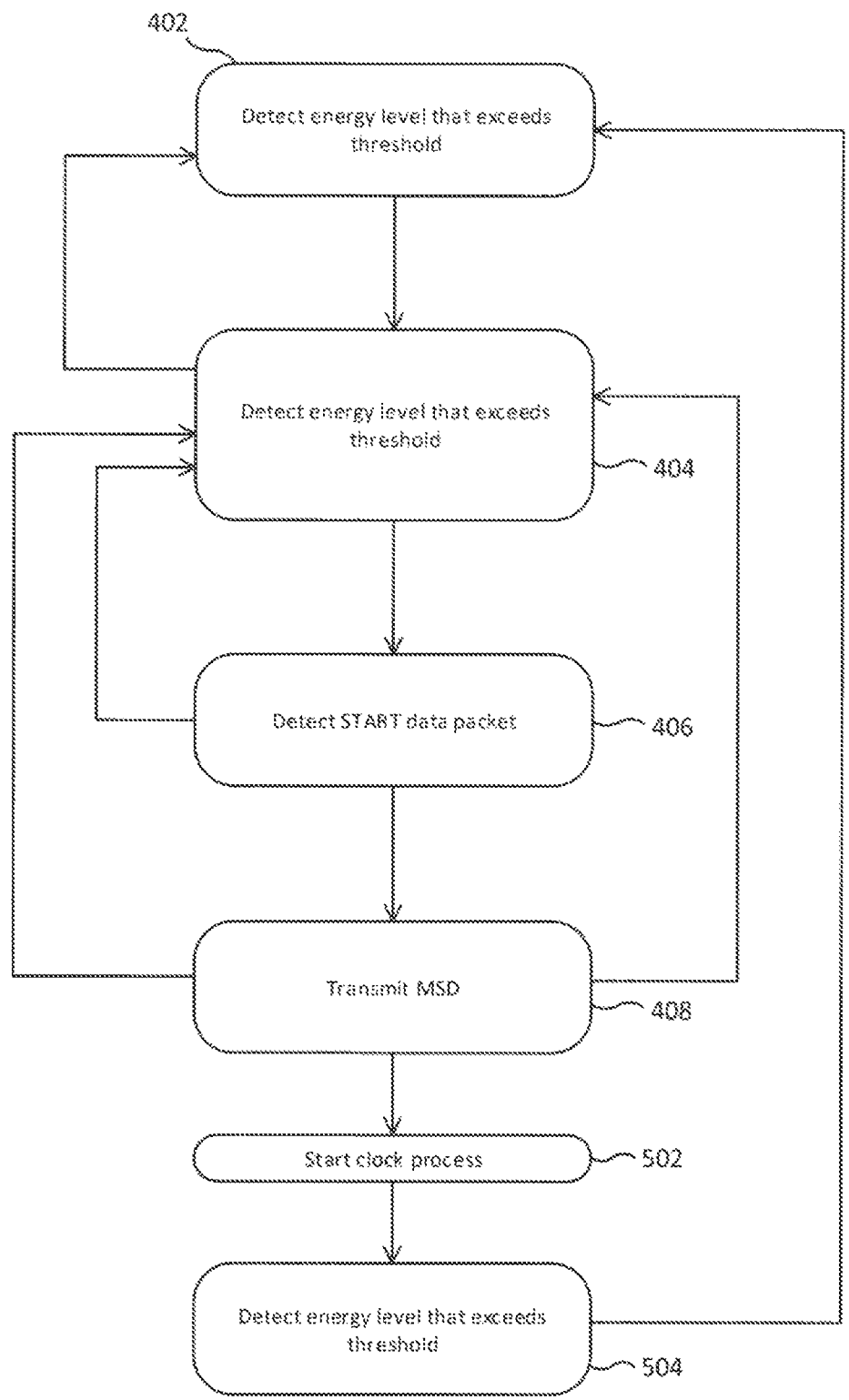
FIG. 5 shows a flow diagram that a communication device may be configured to execute.

FIG. 5 shows a flow diagram that a communication device may be configured to execute. The communication device may be configured to execute 502 instead of 410 of the communication device of FIG. 4.

In 502, the processor may be configured to start a clock process at a starting time that may determine an elapsed time that is elapsed since the starting time.

In 504, the processor may be configured to determine if a synchronization data packet of a first acknowledgement message is received in a sixth time period and a seventh time period. The processor may be configured to determine the energy level of the signal in the predefined audio frequency range is equal to or exceeds the first threshold in the sixth time period. Moreover, the processor may be configured to determine a second energy level sequence of the signal in the predefined audio frequency range in the seventh time period following the sixth time period. Moreover, the processor may be configured to determine if each determined energy level of the signal of the second energy level sequence is equal to or exceeds the second threshold. Further, the processor may be configured to determine if a synchronization data packet of a second acknowledgment message is received in an eighth time period. The processor may be configured to determine if the energy level of the signal in the predefined audio frequency range is below the first threshold in an eighth time period following the seventh time period. If the above determinations of the processor are positive the processor may be configured to activate the audio output of the audio output device. Further, the communication device may be configured to execute 402. If at least one of the above determinations of the processor is negative and the elapsed time of the clock process is below a time out threshold the processor may be configured to restart the execution of 504. Otherwise, the processor may be configured to activate the audio output of the audio output device and to execute 402.

In an example, the eighth time period may be 450 ms.

In an example, the maximum elapsed time period of 504 may be 450 ms.

Otherwise, aspects of the communication device of FIG. 5 may correspond to aspects of the communication device of FIG. 4.

Figure 6:
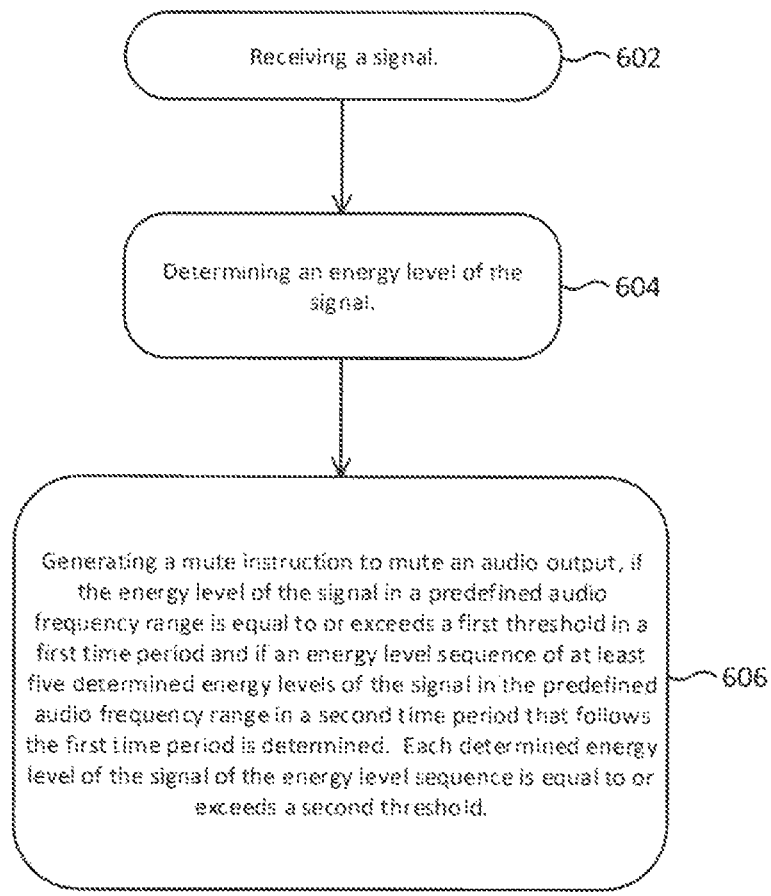
FIG. 6 shows a first method for radio communication.

FIG. 6 shows a first method for radio communication.

The first method may include, in 602, receiving a signal.

The first method may further include, in 604, determining an energy level of the signal.

The first method may further include, in 606, generating a mute instruction to mute an audio output, if the energy level of the signal in a predefined audio frequency range is equal to or exceeds a first threshold in a first time period and if an energy level sequence of a plurality of determined energy levels in the predefined audio frequency range in a second time period following the first time period is determined, in which each determined energy level of the signal of the energy level sequence is equal to or exceeds a second threshold.

Figure 7:
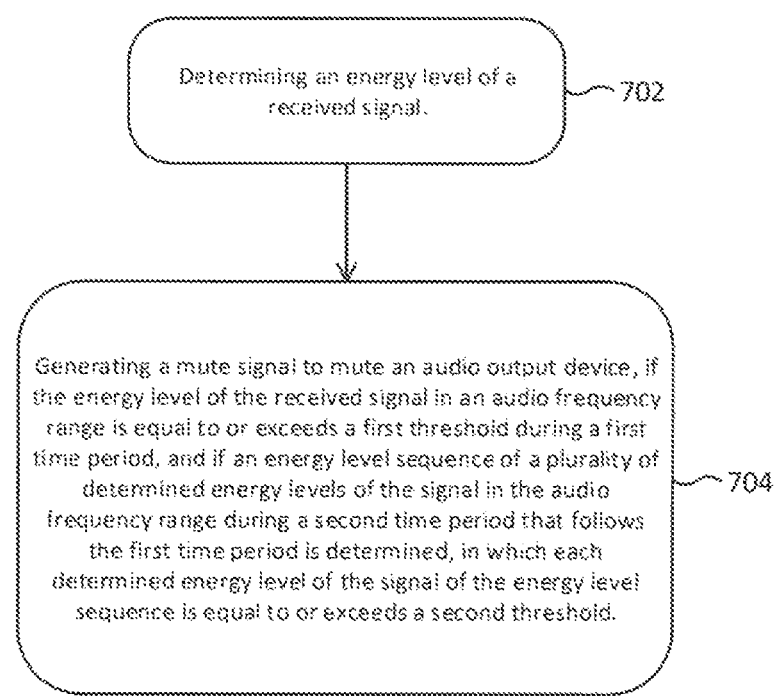
FIG. 7 shows a second method for radio communication.

FIG. 7 shows a second method for radio communication.

The second method may include, in 702, determining an energy level of a received signal.

The second method may further include, in 704, generating a mute signal to mute an audio output device, if the energy level of the received signal in an audio frequency range is equal to or exceeds a first threshold during a first time period, and if an energy level sequence of a plurality of determined energy levels of the signal in the audio frequency range during a second time period following the first time period is determined, in which each determined energy level of the signal of the energy level sequence is equal to or exceeds a second threshold.

Figure 8:
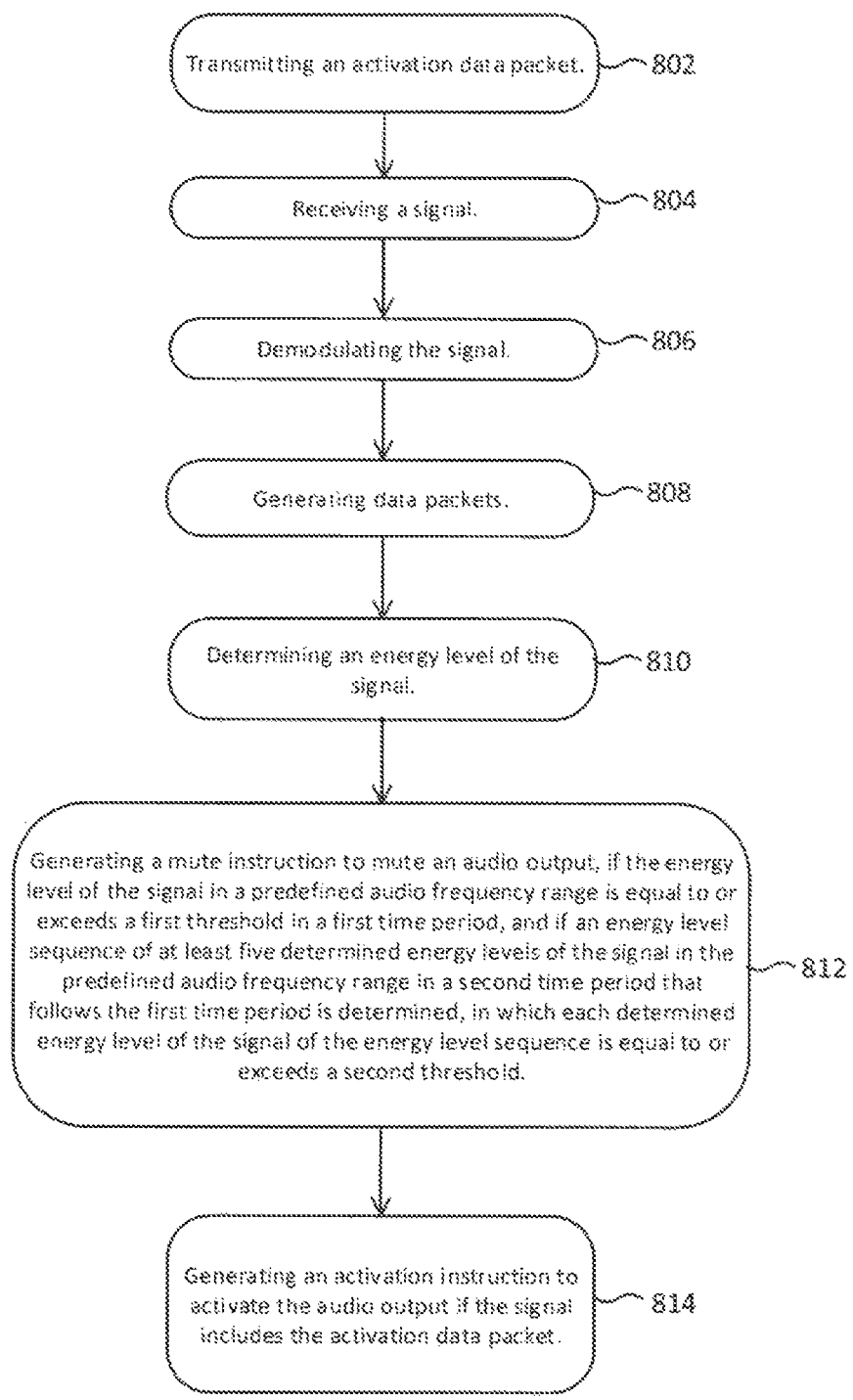
FIG. 8 shows a third method for radio communication.

FIG. 8 shows a third method for radio communication.

The third method may include, in 802, transmitting an activation data packet.

The third method may further include, in 804, receiving a signal.

The third method may further include, in 806, demodulating the signal.

The third method may further include, in 808, generating data packets.

The third method may further include, in 810, determining an energy level of the signal.

The third method may further include, in 812, generating a mute instruction to mute an audio output, if the energy level of the signal in a predefined audio frequency range is equal to or exceeds a first threshold in a first time period, and if an energy level sequence of a plurality of determined energy levels in the predefined audio frequency range in a second time period following the first time period is determined, in which each determined energy level of the signal of the energy level sequence is equal to or exceeds a second threshold.

The third method may further include, in 814, generating an activation instruction to activate the audio output if the signal includes the activation data packet.

It should be noted that aspects described in the context of the communication device according to the examples of FIG. 1, FIG. 2, FIG. 3 and FIG. 4 are analogously valid for the methods that are illustrated based on FIG. 5, FIG. 6, FIG. 7 and FIG. 8.

Example 1 is a communication device. The communication device may include a receiver configured to receive a signal, a determination circuit configured to determine an energy level of the signal and at least one processor configured to generate a mute instruction to mute an audio output, if the energy level of the signal in a predefined audio frequency range is equal to or exceeds a first threshold in a first time period and if an energy level sequence of a plurality of determined energy levels in the predefined audio frequency range in a second time period following the first time period is determined, in which each determined energy level of the signal of the energy level sequence is equal to or exceeds a second threshold.

In Example 2, the subject matter of Example 1 can optionally include that the predefined audio frequency range may include at least one of a group of frequencies consisting of about 500 Hz and about 800 Hz. The energy level of the signal in the first time period may be equal to or exceed the first threshold in at least one of the group of frequencies.

In Example 3, the subject matter of any one of Examples 1 to 2 can optionally include that the first time period may be equal or less than about 64 milliseconds and the second time period may be equal or less than about 260 milliseconds.

In Example 4, the subject matter of any one of Examples 1 to 3 can optionally include that the communication device may further include a demodulation circuit configured to demodulate the signal in the second time period and to generate data packets. The at least one processor may be configured to generate the mute instruction to mute the audio output, if the energy level of the signal in the predefined audio frequency range is equal to or exceeds the first threshold in the first time period, if the energy level sequence of the plurality of determined energy levels in the predefined audio frequency range in the second time period following the first time period is determined, in which each determined energy level of the signal of the energy level sequence is equal to or exceeds the second threshold and if a data packet of the generated data packets includes a predefined bit sequence.

In Example 5, the subject matter of any one of Examples 1 to 4 can optionally include that the second threshold may be greater than the first threshold.

In Example 6, the subject matter of any one of Examples 1 to 5 can optionally include that the signal may be a radio frequency signal.

In Example 7, the subject matter of any one of Examples 1 to 6 can optionally include that the determination circuit may be configured to determine the energy level of the signal in the at least one frequency by a Discrete Fourier Transform algorithm.

In Example 8, the subject matter of Example 7 can optionally include that the Discrete Fourier Transform algorithm may be one of a group of algorithms consisting of Goertzel algorithm and Fast Fourier Transform.

In Example 9, the subject matter of any one of Examples 1 to 8 can optionally include that the mute instruction may be generated in a third time period of about 20 milliseconds following the second time period.

In Example 10, the subject matter of any one of Examples 1 to 9 can optionally include that the at least one processor may be configured to generate an activation instruction to activate the audio output if the energy level of the signal in the predefined audio frequency range is below the first threshold in a fourth time period following the second time period.

In Example 11, the subject matter of any one of Examples 1 to 9 can optionally include that the at least one processor may be configured to generate an activation instruction to activate the audio output, if the energy level of the signal in the predefined audio frequency range is equal to or exceeds the first threshold in a fifth time period following the second time period, if a second energy level sequence of a plurality of determined energy levels in the predefined audio frequency range in a sixth time period following the fifth time period is determined, in which each determined energy level of the signal of the second energy level sequence is equal to or exceeds the second threshold and if the energy level of the signal in the predefined audio frequency range is below the first threshold in a seventh time period following the sixth time period.

In Example 12, the subject matter of Example 10 can optionally include that the at least one processor may be configured to generate the activation instruction to activate the audio output, if the energy level of the signal in the predefined audio frequency range is equal to or exceeds the first threshold in a fifth time period following the fourth time period, if a second energy level sequence of a second plurality of determined energy levels in the predefined audio frequency range in a sixth time period following the fifth time period is determined, in which each determined energy level of the signal of the second energy level sequence is equal to or exceeds the second threshold and if the energy level of the signal in the predefined audio frequency range is below the first threshold in a seventh time period following the sixth time period.

In Example 13, the subject matter of any one of Examples 11 to 12 can optionally include that the predefined audio frequency range may include at least one of a group of frequencies consisting of about 500 Hz and about 800 Hz. The energy level of the signal in the fifth time period may be equal to or exceeds the first threshold in at least one of the group of frequencies.

In Example 14, the subject matter of any one of Examples 11 to 13 can optionally include that the duration of the seventh time period may be in a range from about 400 milliseconds to about 500 milliseconds.

In Example 15, the subject matter of any one of Examples 1 to 14 can optionally include that the communication device may further include that the audio output may be coupled to the processor to receive the mute instruction.

In Example 16, the subject matter of any one of Examples 1 to 15 can optionally include that the communication device may be configured as a communication terminal device.

Example 17 is a communication device. The communication device may include a circuit configured to determine an energy level of a received signal. Further, the communication device may include at least one processor configured to generate a mute signal to mute an audio output device, if the energy level of the received signal in an audio frequency range is equal to or exceeds a first threshold during a first time period and if an energy level sequence of a plurality of determined energy levels of the signal in the audio frequency range during a second time period following the first time period is determined, in which each determined energy level of the signal of the energy level sequence is equal to or exceeds a second threshold.

In Example 18, the subject matter of Example 17 can optionally include that the audio frequency range may include at least one of a group of frequencies consisting of about 500 Hz and about 800 Hz. The energy level of the received signal during the first time period may be equal to or exceed the first threshold in at least one of the group of frequencies.

In Example 19, the subject matter of any one of Examples 17 to 18 can optionally include that the first time period may be equal or less than about 64 milliseconds and the second time period may be equal or less than about 260 milliseconds.

In Example 20, the subject matter of any one of Examples 17 to 18 can optionally include that the communication device may further include a demodulation circuit configured to demodulate the received signal during the second time period and to generate data packets. The at least one processor may be configured to generate the mute signal to mute the audio output device, if the energy level of the signal in the audio frequency range is equal to or exceeds the first threshold during the first time period, if the energy level sequence of the plurality of determined energy levels of the signal in the audio frequency range during the second time period following the first time period is determined, in which each determined energy level of the signal of the energy level sequence is equal to or exceeds the second threshold and if a data packet of the generated data packets includes a predefined bit sequence.

In Example 21, the subject matter of any one of Examples 17 to 20 can optionally include that the second threshold may be greater than the first threshold.

In Example 22, the subject matter of any one of Examples 17 to 21 can optionally include that the received signal may be a radio frequency signal.

In Example 23, the subject matter of any one of Examples 17 to 22 can optionally include that the determination circuit may be configured to determine the energy level of the received signal in the at least one frequency by a Discrete Fourier Transform algorithm.

In Example 24, the subject matter of Example 23 can optionally include that the Discrete Fourier Transform algorithm may be one of a group of algorithms consisting of Goertzel algorithm and Fast Fourier Transform.

In Example 25, the subject matter of any one of Examples 17 to 24 can optionally include that the mute signal may be generated during a third time period of about 20 milliseconds following the second time period.

In Example 26, the subject matter of any one of Examples 17 to 25 can optionally include that the at least one processor may be configured to generate an activation instruction to activate the audio output device if the energy level of the signal in the audio frequency range may be below the first threshold during a fourth time period following the second time period.

In Example 27, the subject matter of any one of Examples 17 to 25 can optionally include that the at least one processor may be configured to generate an activation instruction to activate the audio output device, if the energy level of the signal in the audio frequency range is equal to or exceeds the first threshold during a fifth time period following the second time period, if a second energy level sequence of a second plurality of determined energy levels of the signal in the audio frequency range during a sixth time period following the fifth time period is determined, in which each determined energy level of the signal of the second energy level sequence is equal to or exceeds the second threshold and if the energy level of the signal in the audio frequency range is below the first threshold during a seventh time period following the sixth time period.

In Example 28, the subject matter of any one of Examples 17 to 28 can optionally include that the at least one processor may be configured to generate the activation instruction to activate the audio output device, if the energy level of the signal in the audio frequency range is equal to or exceeds the first threshold during a fifth time period following the fourth time period, if a second energy level sequence of a second plurality of determined energy levels of the signal in the audio frequency range during a sixth time period following the fifth time period is determined, in which each determined energy level of the signal of the second energy level sequence is equal to or exceeds the second threshold and if the energy level of the signal in the audio frequency range is below the first threshold during a seventh time period following the sixth time period.

In Example 29, the subject matter of any one of Examples 27 to 28 can optionally include that the audio frequency range may include at least one of a group of frequencies consisting of about 500 Hz and about 800 Hz. The energy level of the received signal during the fifth time period may be equal to or exceed the first threshold in at least one of the group of frequencies.

In Example 30, the subject matter of any one of Examples 27 to 29 can optionally include that the duration of the seventh time period may be in a range from about 400 milliseconds to about 500 milliseconds.

In Example 31, the subject matter of any one of Examples 17 to 30 can optionally include that the communication device of any one of claims 17 to 30 may further include that the audio output device may be coupled to the processor to receive the mute signal.

Example 32 is a communication system. The communication system 32 may include a communication device. The communication device may include a receiver configured to receive a signal from a base station, a demodulation circuit configured to demodulate the received signal and to generate data packets, a determination circuit configured to determine an energy level of the received signal and at least one processor configured to generate a mute instruction to mute an audio output, if the energy level of the signal in an audio frequency range is equal to or exceeds a first threshold in a first time period and if an energy level sequence of a plurality of determined energy levels in the audio frequency range in a second time period following the first time period is determined, in which each determined energy level of the signal of the energy level sequence is equal to or exceeds a second threshold. The at least one processor may be configured to generate an activation instruction to activate the audio output if the signal includes an activation data packet that includes an information to activate the audio output.

In Example 33, the subject matter of Example 32 can optionally include that the communication system may further include a base station. The base station may include a transmitter to transmit signals to the communication device.

In Example 34, the subject matter of any one of Examples 32 to 33 can optionally include that the communication system may further include an audio modulation device configured to modulate voice signals to generate radio frequency signals. The audio modulation device may be configured to generate an activation data packet that may include an information to activate the audio output. The receiver may be configured to receive the activation data packet.

Example 35 is a method for radio communication. The method may include receiving a signal, determining an energy level of the signal and generating a mute instruction to mute an audio output, if the energy level of the signal in a predefined audio frequency range is equal to or exceeds a first threshold in a first time period and if an energy level sequence of a plurality of determined energy levels in the predefined audio frequency range in a second time period following the first time period is determined, in which each determined energy level of the signal of the energy level sequence is equal to or exceeds a second threshold.

In Example 36, the subject matter of Example 35 can optionally include that the predefined audio frequency range may include at least one of a group of frequencies consisting of about 500 Hz and about 800 Hz. The energy level of the signal in the first time period may be equal to or exceed the first threshold in at least one of the group of frequencies.

In Example 37, the subject matter of any one of Examples 35 to 36 can optionally include that the first time period may be equal or less than about 64 milliseconds and the second time period may be equal or less than about 260 milliseconds.

In Example 38, the subject matter of any one of Examples 35 to 37 can optionally include that the method may further include demodulating the signal in the second time period, generating data packets and generating the mute instruction to mute the audio output, if the energy level of the signal in the predefined audio frequency range is equal to or exceeds the first threshold in the first time period, if the energy level sequence of the plurality of determined energy levels in the predefined audio frequency range in the second time period following the first time period is determined, in which each determined energy level of the signal of the energy level sequence is equal to or exceeds the second threshold and if a data packet of the generated data packets includes a predefined bit sequence.

In Example 39, the subject matter of any one of Examples 35 to 38 can optionally include that the second threshold may be greater than the first threshold.

In Example 40, the subject matter of any one of Examples 35 to 39 can optionally include that the signal may be a radio frequency signal.

In Example 41, the subject matter of any one of Examples 35 to 39 can optionally include that the method may further include determining the energy level of the signal in the at least one frequency by a Discrete Fourier Transform algorithm.

In Example 42, the subject matter of Example 41 can optionally include that the Discrete Fourier Transform algorithm may be one of a group of algorithms consisting of Goertzel algorithm and Fast Fourier Transform.

In Example 43, the subject matter of any one of Examples 35 to 42 can optionally include that the mute instruction may be generated in a third time period of about 20 milliseconds following the second time period.

In Example 44, the subject matter of any one of Examples 35 to 43 can optionally include that the method may further include generating an activation instruction to activate the audio output if the energy level of the signal in the predefined audio frequency range is below the first threshold in a fourth time period following the second time period.

In Example 45, the subject matter of any one of Examples 35 to 44 can optionally include that the method may further include generating an activation instruction to activate the audio output, if the energy level of the signal in the predefined audio frequency range is equal to or exceeds the first threshold in a fifth time period following the second time period, if a second energy level sequence of a plurality of determined energy levels in the predefined audio frequency range in a sixth time period following the fifth time period is determined, in which each determined energy level of the signal of the second energy level sequence is equal to or exceeds the second threshold and if the energy level of the signal in the predefined audio frequency range is below the first threshold in a seventh time period following the sixth time period.

In Example 46, the subject matter of Example 44 can optionally include that the method may further include generating the activation instruction to activate the audio output, if the energy level of the signal in the predefined audio frequency range is equal to or exceeds the first threshold in a fifth time period following the fourth time period, if a second energy level sequence of a second plurality of determined energy levels in the predefined audio frequency range in a sixth time period following the fifth time period is determined, in which each determined energy level of the signal of the second energy level sequence is equal to or exceeds the second threshold and if the energy level of the signal in the predefined audio frequency range is below the first threshold in a seventh time period following the sixth time period.

In Example 47, the subject matter of any one of Examples 45 to 46 can optionally include that the predefined audio frequency range may include at least one of a group of frequencies consisting of about 500 Hz and about 800 Hz. The energy level of the signal in the fifth time period may be equal to or exceeds the first threshold in at least one of the group of frequencies.

In Example 48, the subject matter of any one of Examples 45 to 47 can optionally include that the duration of the seventh time period may be in a range from about 400 milliseconds to about 500 milliseconds.

Example 49 is a method for radio communication. The method may include determining an energy level of a received signal and generating a mute signal to mute an audio output device, if the energy level of the received signal in an audio frequency range is equal to or exceeds a first threshold during a first time period and if an energy level sequence of a plurality of determined energy levels of the signal in the audio frequency range during a second time period following the first time period is determined, in which each determined energy level of the signal of the energy level sequence is equal to or exceeds a second threshold.

In Example 50, the subject matter of Example 49 can optionally include that the audio frequency range may include at least one of a group of frequencies consisting of about 500 Hz and about 800 Hz. The energy level of the received signal during the first time period may be equal to or exceed the first threshold in at least one of the group of frequencies.

In Example 51, the subject matter of any one of Examples 49 to 50 can optionally include that the first time period may be equal or less than about 64 milliseconds and the second time period may be equal or less than about 260 milliseconds.

In Example 52, the subject matter of any one of Examples 49 to 51 can optionally include that the method may further include demodulating the received signal during the second time period and to generate data packets. The at least one processor may be configured to generate the mute signal to mute the audio output device, if the energy level of the signal in the audio frequency range is equal to or exceeds the first threshold during the first time period, if the energy level sequence of the plurality of determined energy levels of the signal in the audio frequency range during the second time period following the first time period is determined, in which each determined energy level of the signal of the energy level sequence is equal to or exceeds the second threshold and if a data packet of the generated data packets includes a predefined bit sequence.

In Example 53, the subject matter of any one of Examples 49 to 52 can optionally include that the second threshold may be greater than the first threshold.

In Example 54, the subject matter of any one of Examples 49 to 53 can optionally include that the received signal may be a radio frequency signal.

In Example 55, the subject matter of any one of Examples 49 to 54 can optionally include that the method may further include determining the energy level of the received signal in the at least one frequency by a Discrete Fourier Transform algorithm.

In Example 56, the subject matter of Example 55 can optionally include that the Discrete Fourier Transform algorithm may be one of a group of algorithms consisting of Goertzel algorithm and Fast Fourier Transform.

In Example 57, the subject matter of any one of Examples 49 to 56 can optionally include that the mute signal may be generated during a third time period of about 20 milliseconds following the second time period.

In Example 58, the subject matter of any one of Examples 49 to 57 can optionally include that the method may further include generating an activation instruction to activate the audio output device if the energy level of the signal in the audio frequency range is below the first threshold during a fourth time period following the second time period.

In Example 59, the subject matter of any one of Examples 49 to 57 can optionally include that the method may further include generating an activation instruction to activate the audio output device, if the energy level of the signal in the audio frequency range is equal to or exceeds the first threshold during a fifth time period following the second time period, if a second energy level sequence of a second plurality of determined energy levels of the signal in the audio frequency range during a sixth time period following the fifth time period is determined, in which each determined energy level of the signal of the second energy level sequence is equal to or exceeds the second threshold and if the energy level of the signal in the audio frequency range is below the first threshold during a seventh time period following the sixth time period.

In Example 60, the subject matter of Example 58 can optionally include that the method may further include generating the activation instruction to activate the audio output device, if the energy level of the signal in the audio frequency range is equal to or exceeds the first threshold during a fifth time period following the fourth time period, if a second energy level sequence of a second plurality of determined energy levels of the signal in the audio frequency range during a sixth time period following the fifth time period is determined, in which each determined energy level of the signal of the second energy level sequence is equal to or exceeds the second threshold and if the energy level of the signal in the audio frequency range is below the first threshold during a seventh time period following the sixth time period.

In Example 61, the subject matter of any one of Examples 45 to 60 can optionally include that the audio frequency range may include at least one of a group of frequencies consisting of about 500 Hz and about 800 Hz. The energy level of the received signal during the fifth time period is equal to or exceeds the first threshold in at least one of the group of frequencies.

In Example 62, the subject matter of any one of Examples 59 to 61 can optionally include that the duration of the seventh time period may be in a range from about 400 milliseconds to about 500 milliseconds.

In Example 63, the subject matter of any one of Examples 49 to 62 can optionally include that the method may further include coupling the audio output device to the processor to receive the mute signal.

Example 64 is a method for radio communication. The method may include transmitting an activation data packet, receiving a signal, demodulating the signal, generating data packets, determining an energy level of the signal and generating a mute instruction to mute an audio output, if the energy level of the signal in a predefined audio frequency range is equal to or exceeds a first threshold in a first time period and if an energy level sequence of a plurality of determined energy levels in the predefined audio frequency range in a second time period following the first time period is determined, in which each determined energy level of the signal of the energy level sequence is equal to or exceeds a second threshold. The method may further include generating an activation instruction to activate the audio output if the signal includes the activation data packet.

In Example 65, the subject matter of Example 64 can optionally include that the method may further include modulating voice signals to generate radio frequency signals, generating an activation data packet that may include an information to activate the audio output and receiving the activation data packet.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device, comprising:
   a receiver configured to receive a signal;
   a determination circuit configured to determine an energy level of the signal;
   at least one processor configured to generate a mute instruction to mute an audio output based on the energy level of the signal in a predefined audio frequency range meeting a first threshold in a first time period,
   wherein the at least one processor is configured to determine whether the energy level of the signal in the predefined audio frequency range meets a second threshold in a second time period after the first time period, and
   wherein the at least one processor is configured to revoke the mute instruction based on the second threshold not being met in the second time period, and wherein the at least one processor is configured to maintain the mute instruction based on the second threshold being met in the second time period; and
   a demodulation circuit configured to demodulate the signal in the second time period and to generate data packets, wherein the at least one processor is configured to maintain the mute instruction, in addition to the second threshold being met in the second time period, based on a data packet of the generated data packets comprising a predefined bit sequence.

2. The communication device of claim 1,
   wherein the predefined audio frequency range comprises at least one of a group of frequencies consisting of about 500 Hz and about 800 Hz, and
   wherein the energy level of the signal in the first time period meets the first threshold in at least one of the group of frequencies.

3. The communication device of claim 1,
   wherein the signal is a radio frequency signal.

4. The communication device of claim 1, wherein the determination circuit is configured to determine the energy level of the signal in the at least one frequency by a Discrete Fourier Transform algorithm, wherein the Discrete Fourier Transform algorithm is one of a group of algorithms consisting of:
   Goertzel algorithm; and
   Fast Fourier Transform.

5. The communication device of claim 1,
   wherein the at least one processor is configured to generate an activation instruction to activate the audio output based on the energy level of the signal in the predefined audio frequency range failing to meet the first threshold in a fourth time period following a third time period and the second time period.

6. The communication device of claim 5,
   wherein the at least one processor is configured to generate the activation instruction to activate the audio output, based on
   determining that an energy level of the signal in the predefined audio frequency range meets the first threshold in a fifth time period following the second time period,
   determining that a second energy level sequence of a second plurality of determined energy levels in the predefined audio frequency range in a sixth time period following the fifth time period meets the second threshold, and
   determining that the energy level of the signal in the predefined audio frequency range fails to meet the first threshold in a seventh time period following the sixth time period.

7. The communication device of claim 5,
   wherein the at least one processor is configured to generate the activation instruction to activate the audio output, based on
   determining that the energy level of the signal in the predefined audio frequency range meets the first threshold in a fifth time period following the fourth time period,
   determining that a second energy level sequence of a second plurality of determined energy levels in the predefined audio frequency range in a sixth time period following the fifth time period meets the second threshold, and
   determining that the energy level of the signal in the predefined audio frequency range fails to meet the first threshold in a seventh time period following the sixth time period.

8. The communication device of claim 6,
   wherein the predefined audio frequency range comprises at least one of a group of frequencies consisting of about 500 Hz and about 800 Hz, and
   wherein the energy level of the signal in the fifth time period meets the first threshold in at least one of the group of frequencies.

9. The communication device of claim 8,
   wherein the duration of the seventh time period is in a range from about 400 milliseconds to about 500 milliseconds.

10. The communication device of claim 9, configured as a communication terminal device.

11. A communication device, comprising:
a circuit configured to determine an energy level of a received signal;
at least one processor configured to generate a mute signal to mute an audio output device based on the energy level of the received signal in an audio frequency range meeting a first threshold during a first time period,
wherein the at least one processor is configured to determine whether the energy level of the signal in the audio frequency range meets a second threshold in a second time period after the first time period,
wherein the at least one processor is configured to revoke the mute instruction based on the second threshold not being met in the second time period, and wherein the at least one processor is configured to maintain the mute instruction based on the second threshold being met in the second time period; and
a demodulation circuit configured to demodulate the received signal during the second time period and to generate data packets, wherein the at least one processor is configured to maintain the mute instruction, in addition to the second threshold being met in the second time period, based on a data packet of the generated data packets comprising a predefined bit sequence.

12. The communication device of claim 11, wherein the received signal is a radio frequency signal.

13. The communication device of claim 11, wherein the at least one processor is configured to generate an activation instruction to activate the audio output device based on the energy level of the signal in the audio frequency range failing to meet the first threshold during a fourth time period following a third time period and the second time period.

14. The communication device of claim 13, wherein the at least one processor is configured to generate the activation instruction to activate the audio output device based on,
determining that the energy level of the signal in the audio frequency range meets the first threshold during a fifth time period following the second time period,
determining that a second energy level sequence of a second plurality of determined energy levels of the signal in the audio frequency range during a sixth time period following the fifth time period is determined, in which each determined energy level of the signal of the second energy level sequence is equal to or exceeds the second threshold, and
determining that the energy level of the signal in the audio frequency range fails to meet the first threshold during a seventh time period following the sixth time period.

15. The communication device of claim 13, wherein the at least one processor is configured to generate the activation instruction to activate the audio output device based on
determining that the energy level of the signal in the audio frequency range meets the first threshold during a fifth time period following the fourth time period,
determining that a second energy level sequence of a second plurality of determined energy levels of the signal in the audio frequency range during a sixth time period following the fifth time period meets the second threshold, and
determining that the energy level of the signal in the audio frequency range fails to meet the first threshold during a seventh time period following the sixth time period.

16. A communication system, comprising:
a communication device, comprising:
a receiver configured to receive a signal from a base station;
a demodulation circuit configured to demodulate the received signal and to generate data packets;
a determination circuit configured to determine an energy level of the received signal; and
at least one processor configured to generate a mute instruction to mute an audio output, based on the energy level of the signal in an audio frequency range meeting a first threshold in a first time period,
wherein the at least one processor is configured to determine whether the energy level of the signal in the audio frequency range meets a second threshold in a second time period after the first time period,
wherein the at least one processor is configured to revoke the mute instruction based on the second threshold not being met in the second time period, and wherein the at least one processor is configured to maintain the mute instruction based on the second threshold being met in the second time period, and
wherein the at least one processor is configured to generate an activation instruction to activate the audio output if the signal comprises an activation data packet that comprises an information to activate the audio output.

17. The communication system of claim 16, further comprising:
an audio modulation device configured to modulate voice signals to generate radio frequency signals,
wherein the audio modulation device is configured to generate an activation data packet that comprises an information to activate the audio output, and
wherein the receiver is configured to receive the activation data packet.

18. A method for radio communication, comprising:
receiving a signal;
determining an energy level of the signal;
generating a mute instruction to mute an audio output based on the energy level of the signal in a predefined audio frequency range meeting a first threshold in a first time period;
determining whether the energy level of the signal in the predefined audio frequency range meets a second threshold in a second time period after the first time period, and
revoking the mute instruction based on the second threshold not being met in the second time period, or
maintaining the mute instruction based on the second threshold being met in the second time period; and
demodulating the signal in the second time period and generating data packets, wherein maintaining the mute instruction, in addition to the second threshold being met in the second time period, is based on a data packet of the generated data packets comprising a predefined bit sequence.

19. The method of claim 18,
wherein the predefined audio frequency range comprises at least one of a group of frequencies consisting of about 500 Hz and about 800 Hz, and
wherein the energy level of the signal in the first time period meets the first threshold in at least one of the group of frequencies.

20. The method of claim 19, further comprising:
generating an activation instruction to activate the audio output based on the energy level of the signal in the predefined audio frequency range failing to meet the first threshold in a fourth time period following a third time period and the second time period.

21. The method of claim 20, further comprising:
generating the activation instruction to activate the audio output, based on determining that the energy level of the signal in the predefined audio frequency range is meets the first threshold in a fifth time period following the second time period,
determining that a second energy level sequence of a second plurality of determined energy levels in the predefined audio frequency range in a sixth time period following the fifth time period meets the second threshold, and
determining that the energy level of the signal in the predefined audio frequency range fails to meet the first threshold in a seventh time period following the sixth time period.

22. The method of claim 20, further comprising:
generating the activation instruction to activate the audio output, based on determining that the energy level of the signal in the predefined audio frequency range meets the first threshold in a fifth time period following the fourth time period,
determining that a second energy level sequence of a second plurality of determined energy levels in the predefined audio frequency range in a sixth time period following the fifth time period meets the second threshold, and
determining that the energy level of the signal in the predefined audio frequency range fails to meet the first threshold in a seventh time period following the sixth time period.

* * * * *